United States Patent [19]
Commins

[11] 3,852,730
[45] Dec. 3, 1974

[54] EMISSION MONITORING SYSTEM

[76] Inventor: James A. Commins, 7708 Orchard Way, Philadelphia, Pa. 19118

[22] Filed: Oct. 12, 1971

[21] Appl. No.: 188,197

[52] U.S. Cl. .......................... 340/237 R, 340/237 S
[51] Int. Cl. ............................................ H04q 9/00
[58] Field of Search............. 340/203, 237 S, 237 R; 235/151.35

[56] References Cited
UNITED STATES PATENTS

| | | | |
|---|---|---|---|
| 2,753,546 | 7/1956 | Knowles.......................... | 340/203 X |
| 2,917,728 | 12/1959 | Grossman ...................... | 340/203 R |
| 2,961,648 | 11/1960 | Sacks et al. .................. | 340/203 UX |
| 3,145,374 | 8/1964 | Benner........................... | 340/203 X |
| 3,364,476 | 1/1968 | Kahn ........................... | 340/237 R X |
| 3,369,182 | 2/1968 | Freindl........................... | 340/203 X |
| 3,496,558 | 2/1970 | Willson ......................... | 340/237 R |
| 3,628,139 | 12/1971 | Huber............................. | 340/237 S |
| 3,653,014 | 3/1972 | List ............................... | 340/203 R |

Primary Examiner—Harold I. Pitts
Attorney, Agent, or Firm—Gerald J. Weiser; Alfred Stapler; Karl L. Spivak

[57] ABSTRACT

Atmospheric emissions from multiple sources are monitored by measuring at each source certain values of these emissions which are parametrically related to those emission characteristics which it is desired to monitor. These measured values are then transmitted to a central station where they are transformed into indications of said characteristics to be monitored.

10 Claims, 4 Drawing Figures

INVENTOR
JAMES A. COMMINS
BY Alfred Stapler
ATTORNEY

INVENTOR
JAMES A. COMMINS

BY Alfred Stapler

ATTORNEY

EMISSION MONITORING SYSTEM

BACKGROUND OF THE INVENTION

This invention relates to improvements in monitoring emissions of effluents into the atmosphere, and particularly to an integrated system for maintaining frequent and flexible surveillance of such emissions from multiple, dispersed sources.

One of the major difficulties encountered in air pollution control involves the appropriate measurement of the emissions which it is desired to control. These emissions, at least in the case of stationary sources, present difficulties of measurement for several reasons. First, they take place at dispersed locations, because the establishments which give rise to them are generally scattered over substantial geographical areas. Secondly, the nature of the emissions varies widely from one such establishment to another, or even from time to time for a given establishment. This is because the various industrial processes which generate the emissions vary widely in their emission-producing characteristics, and also because of variations in process rates and many other factors. Thirdly, and very importantly, the known methods and instruments for measuring those characteristics of emissions which are to be controlled under applicable laws and regulations are, more often than not, clumsy, complicated, costly, hard to install and even harder to maintain. In some important instances, indeed, there is no satisfactory method presently known for directly accomplishing the desired measurement, especially when such measurement is to be performed on a more or less continuous basis. This is the case, for example, for even such comparatively unesoteric characteristics as weight of particulates emitted per unit time.

Heretofore this characteristic has been determined quite laboriously by performing effluent sampling operations, preferably isokinetically within each stack through which the effluent passes. Having captured a sample of the particulates in this manner, the sample is then removed to a laboratory where it is weighed (and perhaps also analyzed for other characteristics such as particle size distribution). It is apparent that this technique does not lend itself to the making of weight per unit time observations either rapidly or frequently.

SUMMARY OF THE INVENTION

It is, accordingly, an object of this invention to overcome one or more of the shortcomings of the prior art.

It is another object to provide a scheme for monitoring emissions from multiple sources.

It is another object to effect such monitoring from dispersed and disparate sources.

It is still another object to effect such monitoring automatically.

It is a further object to effect such monitoring by means of equipment which is comparatively simple, and easy to install and maintain.

These and other objects which will appear are achieved in accordance with the invention by installing at each emission source which is to be monitored, equipment for automatically sensing one or more physical, or physio-chemical properties of the effluent parametrically related to those characteristics thereof which are to be monitored, transmitting the sensed data to a common, central station, and processing these data at the central station so as to derive therefrom the desired indications of the characteristics to be monitored.

BRIEF DESCRIPTION OF THE DRAWINGS

For further details, reference may be had to the description which follows, in the light of the accompanying drawings wherein.

The same reference numerals are used in the several figures to designate corresponding elements.

DESCRIPTION OF THE PREFERRED EMBODIMENT

One of the applications of the inventive concept is to the measurement of particulate emissions from all the stacks of several establishments within a given area which are potential emitters of such particulates.

Figure 1:
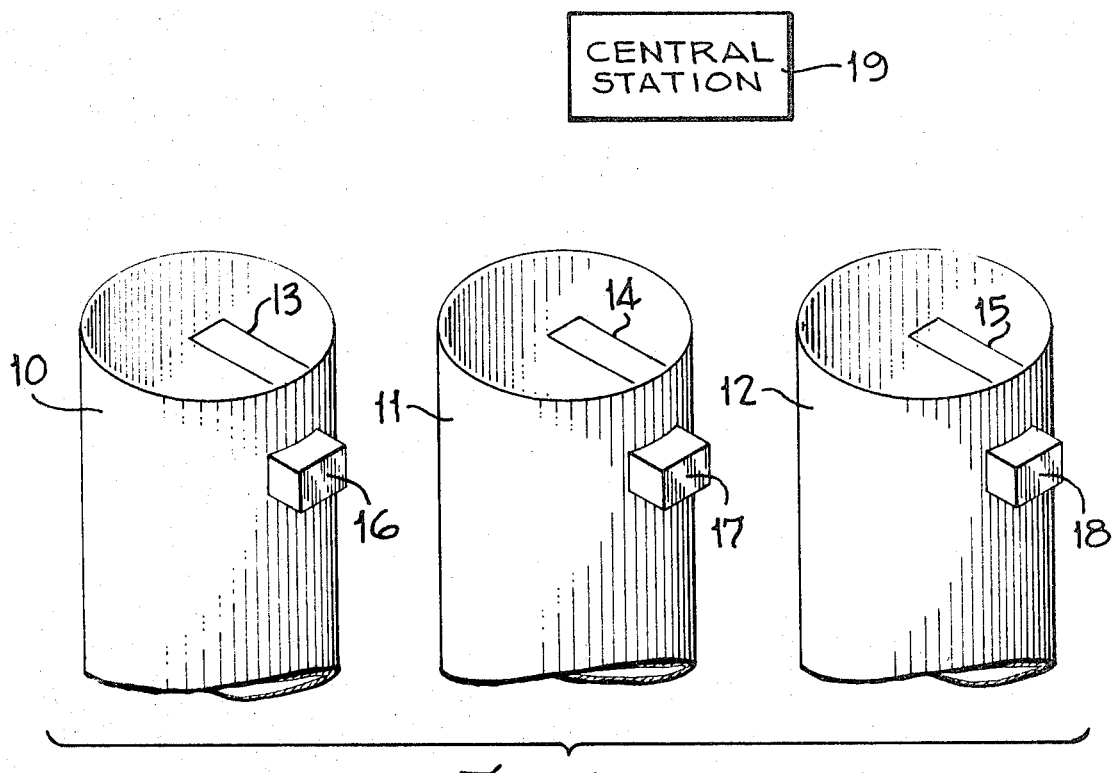
FIG. 1 is a diagrammatic over-all illustration of the emission sources and the central location.

The over-all arrangement for this application is diagrammatically illustrated in FIG. 1, to which reference may now be had. In this figure, there are shown diagrammatically the several particulate-emitting stacks, respectively designated by reference numerals 10, 11 and 12. It should be noted that three stacks have been shown for illustration only, and that far larger numbers of stacks can readily be accommodated by the over-all system. To each stack there are attached the necessary sensing equipments, collectively designated by reference numerals 13, 14 and 15, respectively, and also the respective radio transmitters 16, 17 and 18 for transmitting data representing certain properties of the material flowing through the stacks equipped with sensing equipments 13, 14 and 15.

In a location remote from all these sensing equipments and their associated transmitters, there is a central station 19. At this central station the data from all the transmitters 16, 17 and 18 are received and utilized in the manner described further below.

In dealing with particulate emissions, the parameter to be monitored is often the weight per unit time of such emission. This is the situation assumed to prevail in the application of the invention illustrated in FIG. 1. Accordingly, the sensing equipments 13, 14 and 15, are designed and constructed in such a way as to measure properties of the stack emissions which are parametrically related to this weight of particulates emitted therefrom per unit time.

Figure 2:
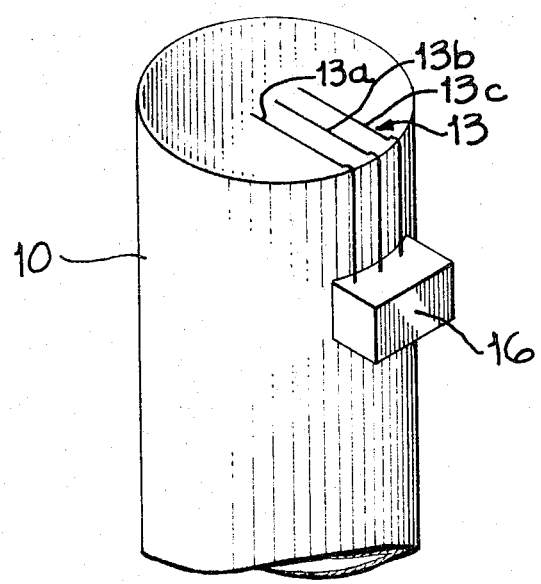
FIG. 2 is a more detailed view of one of the emission sources of FIG. 1.

As shown schematically in FIG. 2, to which reference may now be had, the sensing equipment 13 for stack 10 may consist of three separate sensors, 13a, 13b and 13c. Each of these is mounted inside the stack, and each measures a different property of the material flowing through the stack. Thus, sensor 13a may be a device for measuring the velocity of the material flowing through the stack, sensor 13b may be a device for measuring the temperature of the same material, and sensor 13c a device for measuring its opacity. The properties measured, and the positions of the sensors which do so, are selected on the basis of prior knowledge of stack geometry, general knowledge of the emissions to be monitored, and perhaps even pre-installation tests, so as to yield a set of property measurements which can be transformed, as described more fully hereinafter, through suitable mathematical operations, into indications of the particular emission characteristics to be monitored, such as weight per unit time.

The outputs of sensors 13a, 13b and 13c are normally in the form of electrical signals, which fluctuate in response to variations in the properties to which the sensors respond. As shown in FIG. 2, these signals are all conveyed to the transmitter 16 associated with stack 10, which is preferably attached directly to its outside so as to keep the distances between sensors and transmitter short and thereby minimize the complexity of the electrical connections between them.

Figure 3:
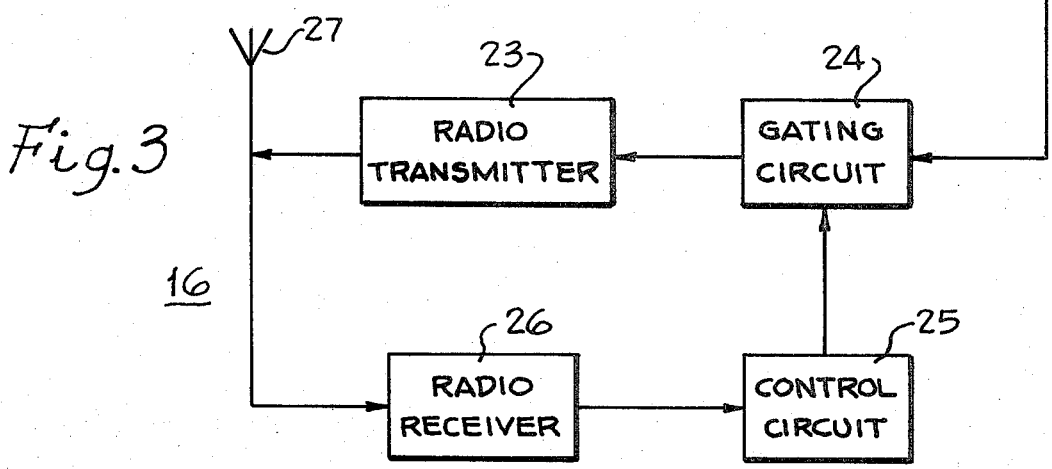
FIG. 3 is a block diagram of the electronic equipment at an emission source.

This transmitter station 16, whose contents are represented in block diagram form in FIG. 3, to which reference may now be had, includes equipment which stores an electrical signal indicative of the instantaneous readings of the sensors. This is preferably accomplished by first electronically sampling the sensor output signals by means of a sampling circuit 20 (after suitable amplification if needed), thereby obtaining at the output of the sampling circuit a single electrical signal, successive portions of which represent the output signals from the different sensors. The output signal from sampling circuit 20 is then further supplied to an analog-to-digital (A/D) converter 21 where the successive portions of the said signal representing the different sensor output signals are transformed into their respective digital equivalents.

These digital equivalents produced by A/D converter 21 are then stored in a memory 22, whose output is connected to a radio transmitter 23 via a gating circuit 24.

Gating circuit 24 is normally closed, and is adapted to be opened to the transmission of signals from memory 22 to transmitter 23 in response to a control signal from a control circuit 25. Control circuit 25 is actuated as follows. A radio receiver 26 is also provided at the transmitter station 16. This receiver receives and detects coded signals broadcast from the central station (19 in FIG. 1) and supplies these detected signals to control circuit 26. Transmitter station 16 has been preassigned one of the codes of the signal broadcast from central station 19. This preassigned code is stored electrically in control circuit 25 and is compared continuously with the codes detected by receiver 26. When the signal detected by receiver 26 contains this particular code, the comparison produces a distinctive signal at the output of control circuit 25, which then opens the gating circuit 24, permitting the signals stored in memory 22 to flow to transmitter 23, whence they are radiated via an antenna 27 for reception at the remotely located central station 19. The same antenna 27 may also service the receiver 26.

Figure 4:
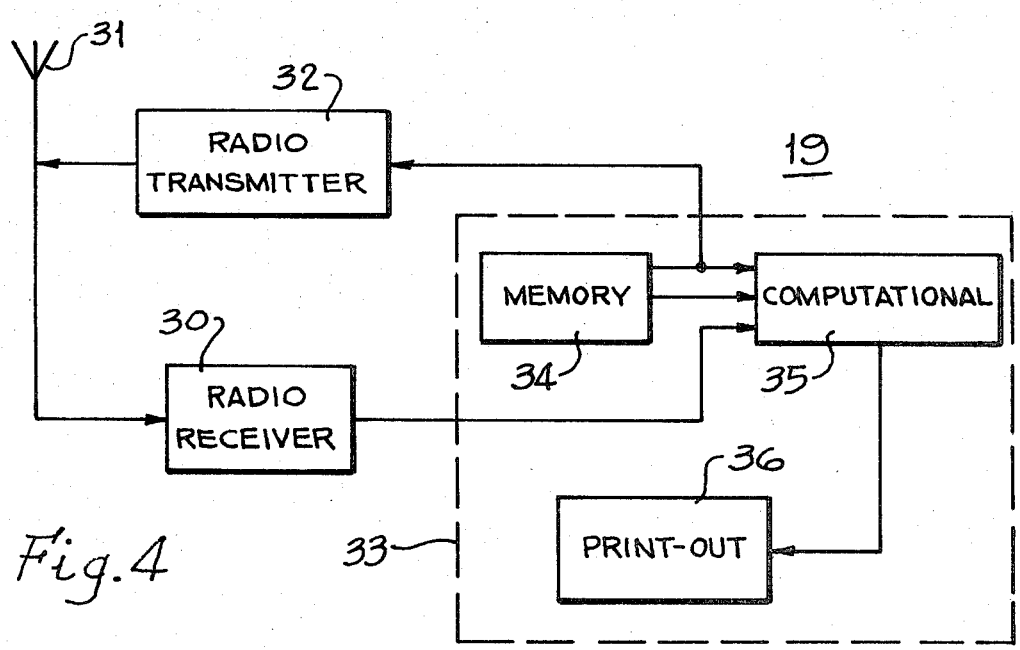
FIG. 4 is a block diagram of the central station.

The contents of the central station are shown in block diagram form in FIG. 4, to which reference may now be had.

This station is equipped with a broadcast receiver 30 which, by means of an antenna 31, receives transmissions from all the various transmitters located at the separate stacks that are served by a single central station, and of which one is shown in previously described FIG. 3. The central station also has a transmitter 32, which may be connected to the same antenna 31 as the receiver for broadcasting to all the various receivers at the separate stacks, as more fully described below.

The central station also includes electronic data processing (EDP) equipment 33 which may consist of a general-purpose computer.

The EDP equipment 33 contains memory facilities 34 in which are stored several address codes, one for each of the separate stack locations to be served by the over-all monitoring system.

Also stored in these memory facilities 34 are programs for arithmetically operating on data represented by the output signals from the group of sensors on any stack (e.g., sensors 13a, 13b and 13c in FIG. 2), in order to derive from these data information concerning those characteristics of the material flowing through the stack which it is desired to monitor. More will be said later about the relationship between these properties to be monitored and the data from the stack sensors themselves.

Finally there are stored in these memory facilities 34 data on the interpretive significance of both the data from the stack sensors themselves and the information concerning the characteristics to be monitored, which is derived from the original sensor data within the EDP equipment 33.

The EDP equipment 33 also includes computational facilities 35 and print-out facilities 36.

The central station receiver 30 is connected to the computational facilitites 36, as is the output from those portions of the memory facilities 34 containing the programs for deriving from the stack sensor data the information concerning the characteristics to be monitored.

This portion of the memory facilities, under the control of its stored address codes, delivers both its stored program outputs and its stored data concerning the interpretive significance of the sensor data, per se, to the computational facilities 35.

The address codes stored in the memory facilities 34 are also delivered to the transmitter 32, at the same time that they control the delivery of program outputs and stored interpretative data to the computational facilities 35, as described above.

The outputs from the computational facilities 35 which are produced in response to the inputs previously described are then supplied to the print-out facilities 36.

The address codes supplied to transmitter 32 from memory facilities 34 are preferably indigital signal format suitable for broadcasting via this transmitter and antenna 31. These codes are the same as were previously discussed in connection with FIG. 2 for selectively actuating the transmissions of data from the sensors on a particular stack to the central station of FIG. 4.

Before proceeding, it is desired to point out that the individual elements previously described are all well-known in the art and therefore are not discussed in further detail. Moreover various specific embodiments, of comparable relative effectiveness, are known, the selection between these being a matter well within the capabilities of one skilled in the art.

The over-all system illustrated in FIGS. 1 through 4, collectively, operates as follows.

The EDP memory facilities 34 at the central station supply to the transmitter 32, which broadcasts them via antenna 31, one after the other, the address codes of the individual stacks forming part of the over-all monitoring system. When the code characteristic of a particular stack is received by the equipment (e.g., receiver 26 of FIG. 3) associated therewith, that receiver triggers the release of the digital signals representing data from the sensors mounted on this particular stack for transmission back to the central station, where they are received by receiver 30 and applied to the EDP equipment's computational facilities 35. Concurrently, the same address code triggers the release from the memory facilities 34 to the computational facilities 35 of the necessary stored programs and data to cooperate with the sensor data received from the stack identified with that particular address code.

Given that one set of these sensor data represents, for example, one reading of the velocity, temperature and opacity of the material flowing in the particular stack (see prior description of FIG. 2), the program content stored in the memory facility 34 for release in conjunction with receipt of these sensor data is such as to convert this set of sensor data into the corresponding value of weight of stack emissions per unit of time (e.g., pounds emitted per hour). Such conversion can readily be made for any particular stack by the application of standard formulae plus specific modifications thereof empirically tailored to the particular conditions of the stack being monitored as the result of prior observations of stack behavior.

The computed value thus obtained is reproduced in visible form by the print-out device 36, under the control of the input from computational facilities 35.

In this way there is generated at the central station a record of this particular emission characteristic for the particular stack being monitored.

In similar fashion, records are generated of emission readings obtained at other times from the same stack, as well as of emission readings from all of the other stacks being monitored.

It will be noted that this over-all monitoring system provides great flexibility in several respects.

For example, the particular arithmetical processing used to translate the data which are derived directly from any given stack into those made available in visible record form at the central station can be altered very conveniently merely by reprogramming and/or changing the data stored in the memory facility 34 of the central station's EDP equipment 33. As another example, any desired comparisons can be made, with great convenience, within this EDP equipment, between the original stack data and reference values of particular significance. Thus, limiting values of opacity, flow velocity, etc., can be stored in the memory facilities 34 for each particular stack, and the data received from the stack compared therewith. If these stack data then go beyond their respective limits, this can be indicated by the print-out device 36, or even by suitable alarm devices (not shown), to alert the monitoring system to an abnormality in stack functioning.

Similarly, the processed data representing weight of emissions per unit time from a given stack can be compared within the EDP equipment with stored values representing the limits of such weight-per-unit-time of emissions which are permissible under applicable emission control regulations, and deviation beyond such limits can also be specially indicated for alerting purposes.

It will be understood, from all the above, that many other modifications will readily occur to those skilled in the art, without departing from the inventive concept. For example, transmission by means of wire lines rather than radio may be used between stacks and central station. As a further example, rather than utilizing the coded signal from the central station to release the transmission of sensor data stored at the stack, this coded signal can be used to trigger a particular measurement by the sensors, the results of which are then immediately transmitted to the central station. Accordingly I desire that concept to be limited only by the appended claims.

I claim:

1. A system for monitoring a predetermined parameter of the atmospheric emissions flowing through a stack from a source of such emissions, comprising:
   means for measuring in said stack the values of several parameters of said emissions different from each other and also different from said predetermined parameter;
   means for transmitting said measured values to a location remote from said source; and
   means for processing said transmitted values at said remote location to derive therefrom the desired monitoring information represented by said predetermined parameter; said means for transmitting operating under the control of said remote location.

2. The system of claim 1 characterized in that said means for measuring operates under the control of said remote location.

3. The system of claim 1 characterized in that said predetermined parameter is the rate of said emissions and said measured parameters are different from but parametrically related to said rate.

4. The system of claim 1 further comprising means for measuring the values of said several emission parameters of emissions from a plurality of different emission sources, and wherein said processing means is effective to derive said predetermined parameters for all said emissions.

5. The system of claim 4 further comprising means for transmitting to said remote location all the said measured values.

6. The system of claim 4 further comprising means for transmitting the said values from said different sources to said remote location in sequence from different ones of said sources.

7. The system of claim 3 further comprising means for deriving from said transmitted values a quantity representative of said emission rate.

8. The system of claim 1 further comprising means for comparing at said remote location said transmitted values with predetermined limiting values.

9. The method of monitoring the atmospheric emissions from a plurality of dispersed smokestacks, comprising the steps of:
   measuring within each stack, certain parameters of the gas flow through the stack which are different from but parametrically related to the emission parameters to be monitored;
   telemetering to a common remote location the measured parameters from all of the stacks; and
   data processing the telemetered values at said remote location to derive therefrom indications of the respective emission parameters to be monitored.

10. The method of claim 9 further comprising controlling said telemetering from said remote location.

* * * * *